United States Patent

Hannon et al.

[11] Patent Number: 5,850,440
[45] Date of Patent: Dec. 15, 1998

[54] TELEPHONE HANDSET MOUNTING RECEPTACLE WITH CARD READER AND METHOD OF POSITIONING THEREOF

[75] Inventors: John Francis Hannon, Gurnee; David William Trahan, Grayslake; Albert Leo Nagele, Wilmette, all of Ill.

[73] Assignee: Motorola, Inc., Schaumburg, Ill.

[21] Appl. No.: 785,123

[22] Filed: Jan. 21, 1997

Related U.S. Application Data

[63] Continuation of Ser. No. 404,808, Mar. 15, 1995, abandoned.

[51] Int. Cl.$^6$ .................................................. H04M 1/00
[52] U.S. Cl. ......................... 379/446; 379/455; 379/454
[58] Field of Search .................................. 379/446, 426, 379/455, 449, 438, 435; 455/90, 575, 128, 347, 348

[56] References Cited

U.S. PATENT DOCUMENTS

| | | |
|---|---|---|
| 3,859,476 | 1/1975 | Morrell et al. . |
| 4,349,706 | 9/1982 | Thompson . |
| 4,406,928 | 9/1983 | MacKenzie . |
| 4,568,801 | 2/1986 | Gates et al. . |
| 4,713,836 | 12/1987 | Suzuki . |
| 4,718,085 | 1/1988 | Haskins .................................. 379/438 |
| 4,741,033 | 4/1988 | Utoh et al. .............................. 379/435 |
| 4,837,814 | 6/1989 | Yoshino et al. . |
| 4,904,549 | 2/1990 | Goodwin et al. . |
| 5,113,436 | 5/1992 | Jarvela et al. . |
| 5,276,588 | 1/1994 | Repplinger et al. ..................... 455/347 |
| 5,308,716 | 5/1994 | Shababy et al. . |
| 5,325,429 | 6/1994 | Kurgan . |

OTHER PUBLICATIONS

ITT ElectroMechanical: CCM 16 NE, 16 NO, 16 NF, Smart Card Connector CCM, Oct. 1990.
Immer Eine Nasenlange Voraus (Always A Nose Ahead); Amphenol–Tuchel Electronics GmbH, Kontaktiereinrichtungen fur Chipkarten, Mar. 1995.
Sirie C702, Kontaktiereinrichtung fur Chipkarten (Chipcardreader), Mar. 1995.
Motorola Information Pack, The Motorola GSM International 2000, Mar. 1994.
Photograph #1–Motorola External Card Reader P/N CCLN2137A, Mar. 1994.
Photograph #2–Motorola Replacement Hang Up Cup P/N CCLN4206B Motorola External Card Reader P/N CCLN2137A, Mar. 1994.
Motorola Information Pack (Motorola 2000), Motorola, Mar. 11, 1994.

*Primary Examiner*—Jack Chiang
*Attorney, Agent, or Firm*—Mark D. Patrick

[57] ABSTRACT

The mounting receptacle (102) for a telephone handset (112) includes a cup portion (203) for receiving a portion of the telephone handset (112) and a card reader portion (205) containing a card reader (301) and an opening (201) for allowing a user to insert an information card (135) into the card reader (301). The cup portion (203) and the card reader portion (205) are attached together via a quick disconnect connector (314, 322) that is integrally formed of the cup portion (203) and the card reader portion (205). The quick disconnect connector allows the opening (201) to be selectively positioned on one of the sides of the mounting receptacle (102) and readily moveable to a different one of the sides of the mounting receptacle (102) by a user.

20 Claims, 6 Drawing Sheets

TELEPHONE HANDSET MOUNTING RECEPTACLE WITH CARD READER AND METHOD OF POSITIONING THEREOF

This is a continuation of application Ser. No. 08/404,808, filed Mar. 15, 1995 and now abandoned.

BACKGROUND OF THE INVENTION

1. Field of the Invention

The present invention relates to telephone handset mounting receptacles and more particularly, to telephone handset mounting receptacles having a card reader.

2. Description of the Related Art

Cellular telephone systems permit a user to participate in a telephone call from virtually any location. Because of this unique convenience, the number of cellular telephone users has increased dramatically in recent years. Mobile cellular telephones are mounted in a vehicle and are powered from the vehicle's electrical system to provide the user with the convenience of a cellular telephone in their vehicle.

Mobile cellular telephones are comprised of a handset and a transceiver. The handset typically includes the user interface of the mobile cellular telephone. The user interface includes a keypad, a display, a microphone, and a speaker. The handset is held by the user in proximity to his or her ear and mouth during a call. The handset is electrically coupled to the cellular transceiver, which in turn, is connected to the vehicle's ignition system.

Mobile cellular telephones are typically used with a receptacle for mounting the handset in a storage position. An example of such a mounting receptacle is the Replacement hang up cup, part number CCLN4206B, manufactured and sold by Motorola, Inc. The mounting receptacle, usually referred to as a telephone receptacle or hang up cup, includes throughholes for mounting. The mounting receptacle is typically mounted in proximity to the user, for example, upon the dashboard of the vehicle. This allows the user use the keypad while the handset is held by the mounting receptacle for dialing or responding to an incoming call.

The mobile cellular telephone may also be utilized in conjunction with a card reader. An example of such a card reader is the External card reader, part number CCLN2137A, manufactured and sold by Motorola, Inc. In the European market, the card reader is used to read subscriber information from an information card, which is also known as a smart card. Upon insertion of the information card into a card slot in the card reader, subscriber information is inspected by the cellular system and used to conduct a call. The card reader may also include both throughholes for mounting and threaded bores that correspond to the throughholes of the mounting receptacle. The threaded bores allow the card reader to be mounted upon the mounting receptacle to effectuate space savings in the limited vehicle compartment.

The mobile cellular telephone, the mounting receptacle, and the card reader require installation in the user's vehicle by skilled service technicians. To conform with industry practices, service technicians mount the mounting receptacle and the card reader in a permanent manner. However, users may wish to reposition the card reader to a new, more convenient position when the vehicle compartment changes. This is a problem because it is time consuming to vary the orientation of the mounted mounting receptacle and the card reader. The card reader must be uninstalled and reinstalled in a new position to change the position of the card reader. In some situations, uninstallation may not be accomplished without hiring skilled service technicians.

Accordingly, it is more desirable to provide a mounting receptacle and card reader which is more convenient for users.

DETAILED DESCRIPTION OF THE PREFERRED EMBODIMENTS

A mounting receptacle for a telephone handset includes a cup portion having a top surface with a recess for receiving a portion of the telephone handset. A card reader portion of the mounting receptacle permits seating of a card reader therein and includes an opening for allowing a user to insert an information card into the card reader. A quick disconnect connector releasably couples the cup portion to the card reader portion. The quick disconnect connector allows the notch to be selectively positioned on one of the sides of the mounting receptacle and readily moveable to a different one of the sides of the mounting receptacle by a user.

Figure 1:
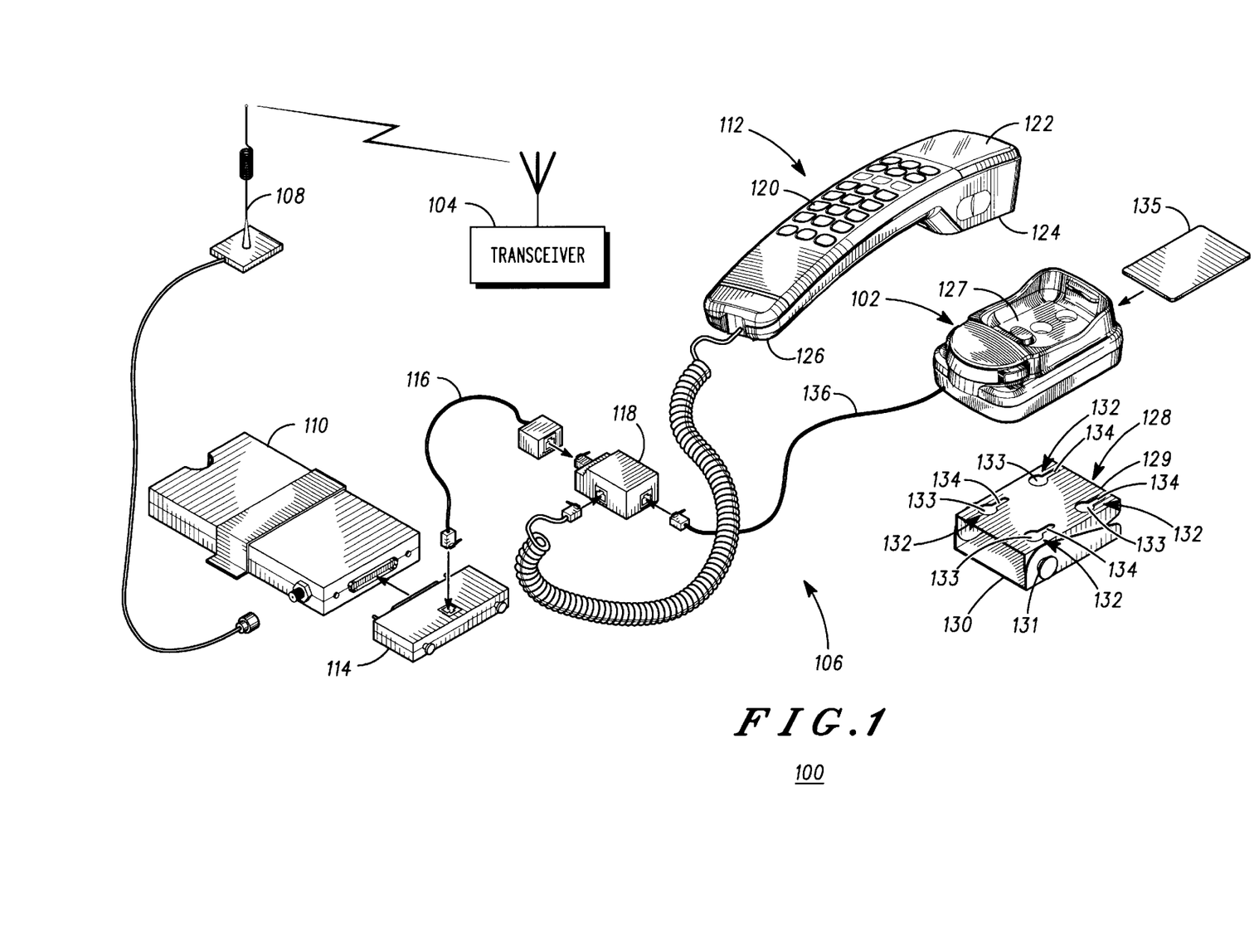
FIG. 1 illustrates a radiotelephone system employing a mounting receptacle.

FIG. 1 illustrates a radiotelephone communication system 100 employing a mounting receptacle 102. The radiotelephone communication system 100 includes a fixed site transceiver 104, representing a cellular base station. The fixed site transceiver 104 transmits and receives radio frequency (RF) signals to and from mobile and portable radiotelephones located within a fixed geographic area. Radiotelephone 106 is a mobile radiotelephone of the type served by the fixed site transceiver 104.

The radiotelephone 106, which is adapted for installation in a vehicle, includes an antenna 108, a transceiver 110, and a handset 112. The antenna 108 receives RF signals from the fixed site transceiver 104. Upon reception, the antenna 108 converts the RF signals into electrical signals input to the transceiver 110. The RF signals include voice and data signals.

The transceiver 110 includes a receiver (not shown), a transmitter (not shown), and a processor (not shown). The transceiver 110 may be any one of a number of commercially available mobile transceivers, such as the Series IV Cellular Mobile Transceiver manufactured and sold by Motorola, Inc. The transceiver 110 is typically mounted away from the vehicle's passenger compartment, e.g., in the trunk of the vehicle. The electrical signals from the antenna 108 are demodulated by the transceiver 110 and coupled to the handset 112 via an interface module 114, a multi-wired cable 116, and an junction box 118. The transceiver 110 is coupled to the vehicle ignition when installed in the vehicle to receive power from the vehicle's electrical system.

The junction box 118 provides a connection point for the handset 112, the transceiver 110, and the mounting receptacle 102. By daisy chaining multiple junction boxes, the user has the increased flexibility of adding additional handsets, card readers, data links, and fax machines.

The handset 112 includes a keypad 120 for entering phone numbers to be called and a display 122 for viewing the phone numbers entered on the keypad 120. A speaker (not shown) is disposed in an earpiece portion 124 of the handset 112 and a microphone (not shown) is disposed on a lower portion 126 of the handset 112. Electrical voice signals coupled to the handset 112 are converted by the speaker into audible sounds discernible by the user's ear. The user's speech is transformed into electrical voice signals via the microphone. The voice signals (as well as phone numbers entered via the keypad) are communicated to the transceiver 110 by way of the junction box 118, the multi-wired cable 116, and the interface module 114. The voice signals are modulated in the transceiver 110 and applied to the antenna 108 for transmission to the fixed site transceiver 104.

The mounting receptacle 102 includes a recess 127 for engaging the earpiece portion 124 of the handset 112. When not in use, the user attaches the handset 112 to the mounting receptacle 102 by inserting the earpiece portion 124 into the recess 127. When initiating or receiving a call, the user releases the handset 112 from the mounting receptacle 102. Once released, the handset 112 can be placed in close proximity to the user's ear and mouth so as to participate in a call. To detect an off-hook condition, a magnet (not shown) is disposed beneath the recess 127 of the mounting receptacle 102 and a reed switch (not shown) is contained within the earpiece portion 124 of the handset 112. When the user releases the handset 112 from the mounting receptacle 102 to receive an incoming call, the reed switch is moved out of the magnetic field of the magnet which changes the state of the reed switch such that the radiotelephone 106 is automatically detected to be off-hook.

A clamshell bracket 128 may be used to mount the mounting receptacle 102 within the vehicle's passenger compartment and in close proximity to the user. The clamshell bracket 128 includes a top portion 129 and a substantially identical bottom portion 130 coupled via a hinge 131. The top portion 129 and the bottom portion 130 are preferably cut and tooled from a 0.25 cm thick sheet of steel. The bottom portion includes throughholes (not shown) for mounting the clamshell bracket 128 to the vehicle compartment surface via screws (not shown). The top portion 129 includes keyhole openings 132 extending therethrough. Each of the keyhole openings 132 includes a circular portion 133 intersected by a slot portion 134 and permit screwless attachment of the mounting receptacle 102 to the clamshell bracket 128. The hinge 131 permits the user to position the mounting receptacle 102 at any angle between 0° and 90° with respect to the plane of the vehicle compartment surface to which the clamshell bracket 128 is attached.

The mounting receptacle 102 receives an information card 135. The information card 135 may be, for example, of the type commonly called a smart card or of the type called a memory card, and may be of a full size or a chip size. If the information card 135 is a smart card, it stores a user's subscriber identification and billing information. If it is a memory card, it stores an account balance denoted by money units which are decremented during a call. Prior to initiating a call the user inserts the information card 135 into the mounting receptacle 102. Upon insertion, the subscriber identification and billing information, or account balance, is read from the information card 135 and coupled to the transceiver 110 via a data transfer cable 136, the junction box 118, the multi-wired cable 116, and the interface module 114. The transceiver 110 transmits the subscriber identification and billing information, or account balance, to the fixed site transceiver 104 via the antenna 108. Upon verification and authorization of the subscriber identification and billing information, the fixed site transceiver 104 enables the transceiver 110 to proceed with initiating the call.

Figure 2:
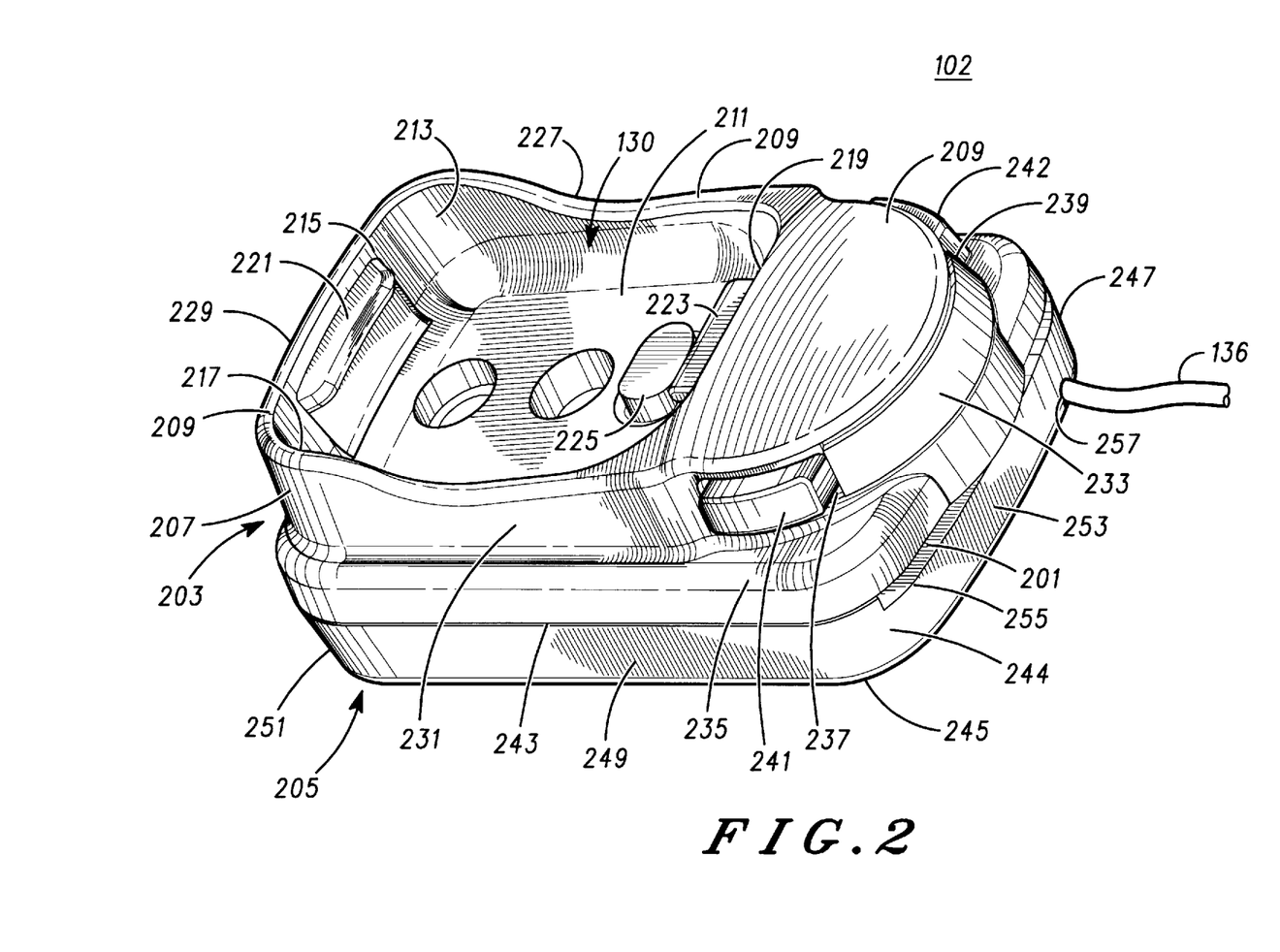
FIG. 2 illustrates a top, left side, and rear perspective view of the mounting receptacle, showing the cup portion attached to the card reader portion and the opening facing rearwardly.

FIG. 2 illustrates a top, left side, and rear perspective view of the mounting receptacle 102, showing a slotted opening 201 facing rearwardly. The mounting receptacle 102 includes a cup portion 203. The cup portion 203 includes a cup portion housing 207 containing a top surface 209. The top surface 209 includes the recess 127 having a recess surface 211. A right recess sidewall 213, a front recess sidewall 215, a left recess sidewall 217, and a rear recess sidewall 219 interconnect the top surface 209 and the recess surface 211.

Attachment of the handset 112 of FIG. 1 to the mounting receptacle 102 is accomplished by a fixed latch member 221 and a retractable latch member 223. The fixed latch member 221 is formed to project outward from the front recess sidewall 215. The retractable latch member 223 extends through an opening in the rear recess sidewall 219 and opposes the fixed latch member 223. Upon insertion of the earpiece portion 124 (FIG. 1) of the handset 112 into the recess 127, the fixed latch member 221 and the retractable latch member 223 mate with latching notches (not shown) disposed on the earpiece portion 124. Once inserted, a spring-loaded button 225 is depressed and exerts an upward force on the earpiece portion and promotes contact between the fixed latch member 221, the retractable latch member 223, and the latching notches disposed on the earpiece portion 124.

The cup portion housing 207 further includes a right outer sidewall 227, a front outer sidewall 229, a left outer sidewall 231, and a rear semicircular sidewall 233. The right outer sidewall 227, the front outer sidewall 229, the left outer sidewall 231, and the rear semicircular sidewall 233 extend between the top surface 209 and a substantially rectangular base portion 235. The rear semicircular sidewall 233 includes a left slot 237 and, although hidden from view, a right slot 239, extending therethrough.

Release of the handset 112 of FIG. 1 from the mounting receptacle 102 is accomplished via the actuation of a left button 241 and/or a right button 242. The left button 241 extends through the left slot 237. The right button 242 extends through the right slot 239. Upon depression of either the left button 241 or the right button 242 or both the left button 241 and the right button 242 into the rear semicircular sidewall 233, the retractable latch member 223 retracts into the rear recess sidewall 219. Once the retractable latch member 223 retracts from the corresponding latching notch of the earpiece portion 124, the spring-loaded button 225 pushes the earpiece portion away from the recess surface 211 and releases the handset 112 from the mounting receptacle 102.

The mechanism coupled between the left button 241, the right button 242, and the retractable latch member 223 is preferably that described in U.S. Pat. No. 5,113,436, entitled "Telephone Hang-up Cup Having Retractable Latch Member Operative Responsive to Actuation Force Applied at Either Side," by Jarvela et al., granted on May 12, 1992, assigned to Motorola, Inc., the assignee of the present invention, which is incorporated herein by reference thereto; although, any suitable conventional latch mechanism could be employed.

The mounting receptacle 102 includes a card reader portion 205. The card reader portion 205 is detachably coupled to the cup portion 203 along a mating line 243. The cup portion 203 and the card reader portion 205 are similarly contoured about the mating line 243 such that when assembled appear as one integral housing. The card reader portion 205 includes a card reader portion housing 244. Both the cup portion housing 207 and the card reader portion housing 244 are preferably molded from a suitable polymer material, such as polycarbonate. The card reader portion housing 244 includes a substantially rectangular bottom surface 245 that interconnects a right sidewall 247, a left sidewall 249, a front sidewall 251, and a rear sidewall 253 extending upward therefrom; that is, extending between the bottom surface 245 and the mating line 243. When coupled as shown in FIG. 2, the right sidewall 247, the left sidewall 249, the front sidewall 251, and the rear sidewall 253 of the card reader portion housing 244 reside substantially beneath the left outer sidewall 231, the right outer sidewall 227, the front outer sidewall 229, and the rear semicircular sidewall 233 of the cup portion housing 207, respectively.

The rear sidewall 253 of the card reader portion includes the slotted opening 201. The slotted opening 201 is formed of a notch 255 in the rear sidewall 253. The notch 255 extends downward from the mating line 243 and longitudinally across the entire rear sidewall 253. The opening 201 is sized to permit insertion of the information card 135 (FIG. 1) from the rear of the mounting receptacle 102.

The rear sidewall 253 further includes an arched opening 257. The arched opening 257 extends from the bottom surface 245. The arched opening 257 allows the data transfer cable 136 to exit from the rear of the mounting receptacle 102.

Figure 3:
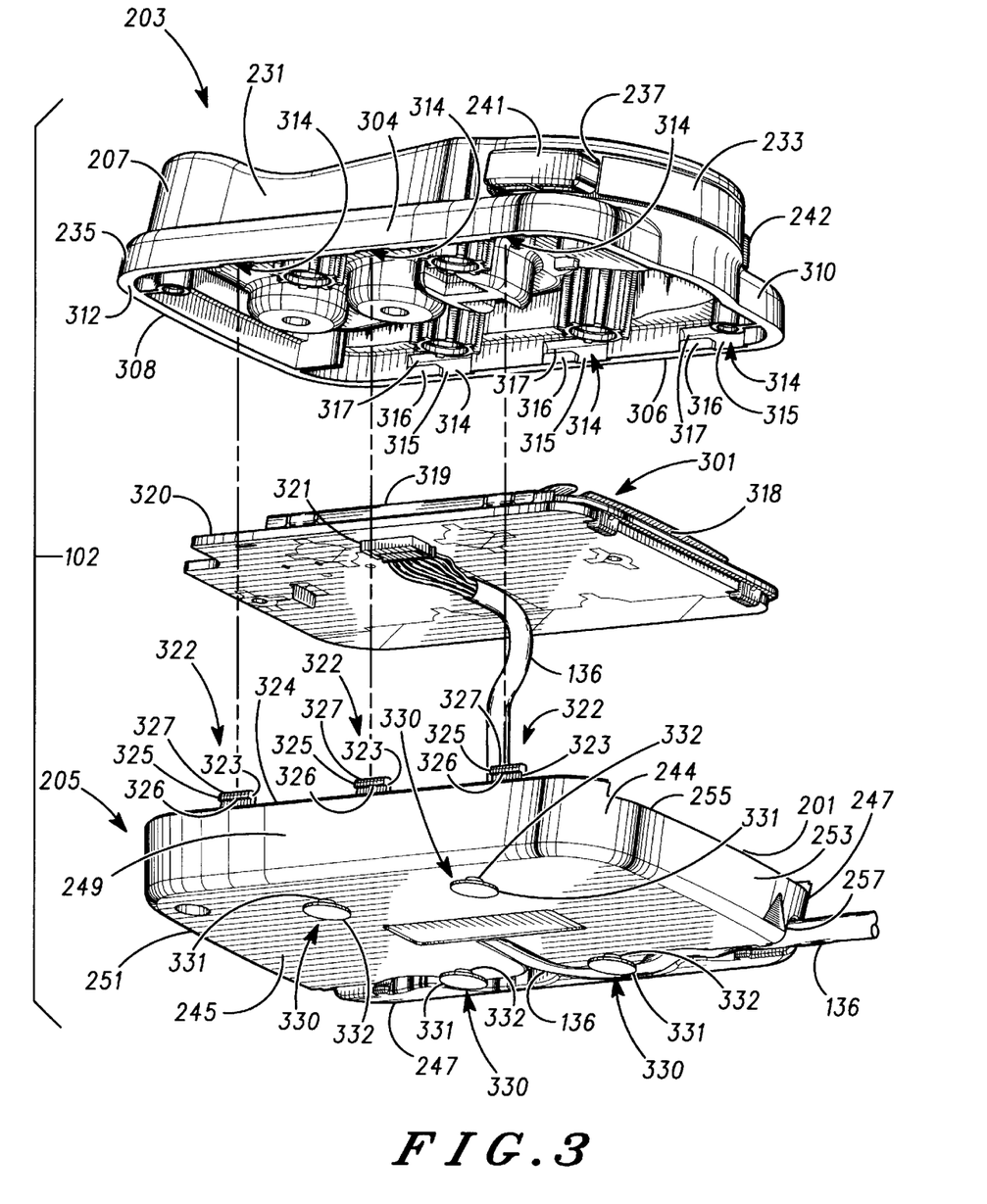
FIG. 3 illustrates a bottom, left side, and rear perspective view of the mounting receptacle of FIG. 2, showing the cup portion disconnected from the card reader portion, and the card reader exploded from the card reader portion.

FIG. 3 illustrates a bottom, left side, and rear perspective view of the mounting receptacle 102 of FIG. 2, showing the cup portion 203 disconnected from the card reader portion 205 and a card reader 301 exploded from the card reader portion 205. In the preferred embodiment, the card reader 301 is fixably mounted within the card reader portion housing 244, both upon the underside of the bottom surface 245 and within the confines of the right sidewall 247, the left sidewall 249, the front sidewall 251, and the rear sidewall 253. The card reader 301 includes an access opening 318 associated with a card chamber 319 attached to a top of a circuit board 320. When the card reader 301 is mounted within the card reader portion housing 244, the access opening 318 is aligned with the slotted opening 201 in the rear sidewall 253 such that the information card 135 (FIG. 1) inserted through the slotted opening 201 is received in the card chamber 319 and electronically coupled to contacts (not shown) of the card reader 301. The contacts are connected to a cable connector 321 via traces (not shown) disposed in the circuit board 320.

The card reader 301 is further described in U.S. Pat. No. 5,325,429, entitled "Apparatus For Accepting and Retaining an Information Card," by Kurgan, granted on Jun. 28, 1994, assigned to Motorola, Inc., the assignee of the present invention, which is incorporated herein by reference thereto.

The cable connector 321 attaches an end of the data transfer cable 136 to a bottom of the circuit board 320. The data transfer cable 136 extends through an opening (not shown) in the bottom surface 245 of the card reader portion housing 244 and exits from the rear sidewall 253 of the card reader portion housing 244 via the arched opening 257. Data from the information card 135 (FIG. 1) is communicated through the data transfer cable 136 to the transceiver 110 (see FIG. 1). The transceiver 110 uses this data to communicate information to the fixed site transceiver 104 (FIG. 1) to establish a call.

The cup portion housing 207 couples to the card reader portion housing 244 in a manner that allows for quick attachment and detachment. The substantially rectangular base portion 235 of the cup portion housing 207 includes a left base wall 304, a right base wall 306, a front base wall 308, and a rear base wall 310 extending downward therefrom and terminating in a bottom edge surface 312. The bottom edge surface 312 designates the footprint of the cup portion 203. A plurality of notches 314 are disposed in an underside of both the left base wall 304 and the right base wall 306 and extend between an underside of the substantially rectangular base portion 235 and the bottom edge surface 312. A first portion 315 of each of the plurality of notches 314 extends orthogonally from the bottom edge surface 312. A second portion 317 of each of the plurality of notches 314 further extends longitudinally along the underside of the right base wall 306 forming an integral ledge portion 316. The first portion 315 and the second portion 317 of each of the plurality of notches 314 in the right base wall 306 are substantially similar to those in the left base wall 304.

The card reader portion housing 244 includes a plurality of mating members 322 that engage the plurality of notches 314 of the cup portion 203. The plurality of mating members 322 extend upward from a top edge surface 324 formed of the right sidewall 247, the left sidewall 249, and the front sidewall 251. In the preferred embodiment, the plurality of mating members 322 are positioned above the left sidewall 249 and, although hidden from view, above the right sidewall 247. Each of the plurality of mating members 322 includes an outwardly extending arm 323 terminating in a hook portion 325. The hook portion 325 includes a lower surface 326 and an upper surface 327. Attachment of the card reader portion 205 to the cup portion 203 is initiated by fitting the plurality of mating members 322 into the plurality of notches 314.

Figure 4:
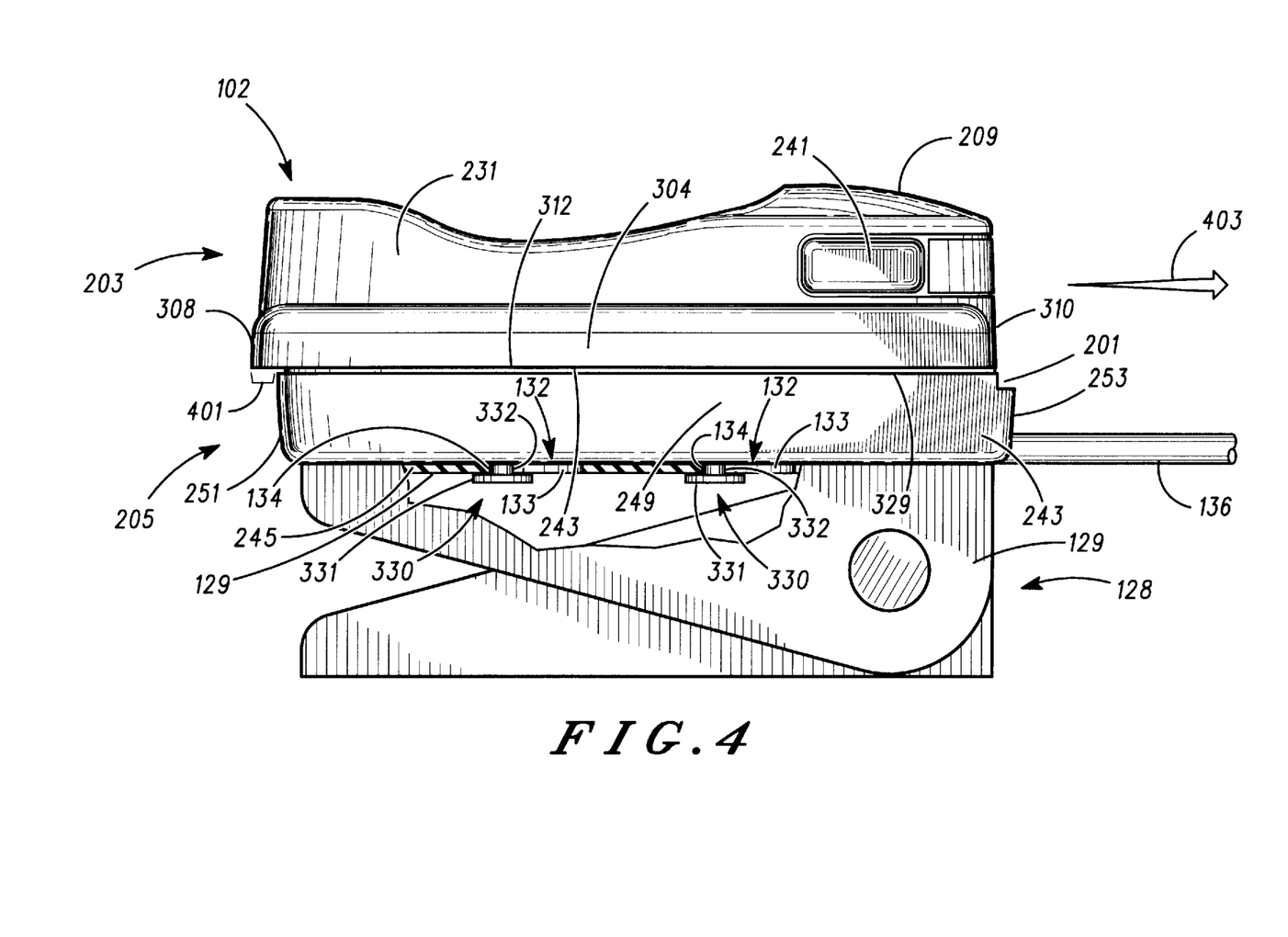
FIG. 4. illustrates a left side view of the mounting receptacle and mounting bracket, showing the cup portion positioned for connection to the card reader portion and the card reader portion attached to the mounting bracket, a portion of the mounting bracket being broken away.

FIG. 4 illustrates a left side view of the mounting receptacle 102, showing the cup portion 203 and the card reader portion 205 juxtaposed and positioned for connection. The mating line 243 is realized via the juxtapositioned bottom edge surface 312 of the cup portion 203 and top edge surface 324 of the card reader portion 205. An overhang 401 further illustrates that the mounting receptacle 102 is not fully connected and, thus, is in a release position. In this position, the hook portion 325 of each of the plurality of mating members 322 is positioned in the first portion 315 of each of the plurality of notches 314 (FIG. 3).

Referring to FIG. 4, complete connection is accomplished by urging or sliding the cup portion 203 in the direction dictated by arrow 403 until the overhang 401 disappears. During sliding, the hook portion 325 of the plurality of mating members 322 (FIG. 3) moves to reside in the second portion 317 of each of the plurality of notches 314 such that the lower surface 326 of the hook portion 325 of each of the plurality of mating members 322 abuts with the integral ledge portion 316 of each of the plurality of notches 314.

Connection is complete when the lower surface 326 of the hook portion 325 is entirely positioned upon the integral ledge portion 316. The mounting receptacle 102 is shown completely connected in FIG. 2, wherein the slotted opening 201 faces rearwardly.

Disconnection of the cup portion 203 from the card reader portion 205 of the mounting receptacle 102, shown completely connected in FIG. 2, is accomplished by substantially reversing the aforementioned steps discussed in relation to FIG. 4. The cup portion 203 is urged or slid in a direction opposite to the direction dictated by arrow 403 until the overhang 401 appears. Once the overhang 401 appears, the lower surface 326 of the hook portion 325 of each of the plurality of mating members 322 is no longer in abutment with the integral ledge portion 316 of each of the plurality of notches 314 (FIG. 3) and the cup portion 203 can be lifted away from the card reader portion 205.

The plurality of notches 314 and the plurality of mating members 322 provide a quick disconnect connector for the cup portion 203 and the card reader portion 205. The user may thus quickly connect and disconnect the cup portion 203 and the card reader portion 205 without extensive use of tools or a great deal of technical expertise. It is envisioned that a fastener, such as a clip, a spring loaded pin, or other readily accessible element, could be provided to further secure the cup portion 203 and the card reader portion 205 when completely connected. Such a fastener would be positioned for ready access and would not substantially increase the time or expertise required for connection and disconnection of the cup portion 203 and the card reader portion 205. The plurality of mating members may extend from the cup portion and the plurality of notches may be formed in the card reader portion.

Aside from quick connection and disconnection of the cup portion 203 and the card reader portion 205 via the plurality of notches 314 and the plurality of mating members 322, the mounting receptacle 102 can also be quickly disconnected from the clamshell bracket 128 (FIG. 1). In FIG. 4 (also see FIG. 3) a plurality of mounting tangs 330 are shown to extend from the bottom surface 245 of the card reader portion housing 244.

Each of the plurality of mounting tangs 330, which are preferably formed from a non malleable metallic material such as brass, include a disc portion 331 mounted on a shaft portion 332. A diameter of the disc portion 331 is smaller than a diameter of the circular portion 133 of each of the plurality of keyhole openings 132 (FIG. 1) of the clamshell bracket 128. This permits insertion of each one of the plurality of mounting tangs 330 into a corresponding one of the plurality of keyhole openings 132. The shaft portion 332 has a diameter less than a width of the slot portion 134 of each plurality of keyhole openings 132.

Connection of the mounting receptacle 102 to the clamshell bracket 128 is accomplished by juxtaposing the bottom surface 245 of the card reader portion 205 with a top surface of the top portion 129 (FIG. 1) of the clamshell bracket 128 such that each of the plurality of mounting tangs 330 have been dropped through the circular portion 133 of corresponding one of the plurality of keyhole openings 132. The mounting receptacle 102 is then slid such that the shaft portion 332 moves into the slot portion 134 of each of the plurality of keyhole openings 132. This draws the disc portion 331 under the top portion 129 of the clamshell bracket 128. The shaft portion 332 is approximately 0.25 cm (the thickness of the top portion 129) to ensure that the top portion 129 is tightly crimped between the bottom surface 245 and an underside of the disc portion 331 of each of the plurality of mounting tangs 330.

Disconnection of the mounting receptacle 102 from the clamshell bracket 128 may be accomplished by sliding the mounting receptacle 102 in a direction opposite of that required for connection. Also, it is envisioned that a readily accessible spring-loaded fastener can be provided to lock the connection of the mounting receptacle 102 and the clamshell bracket 128 without hampering the users ability for quick connection and disconnection.

Aside from quick connection and disconnection, the plurality of notches 314 and the plurality of mating members 322 permit connection of the cup portion 203 to the card reader portion 205 either frontwardly or rearwardly. The plurality of mating members 322, which may comprise two end members and a middle member extending above both the left sidewall 249 and right sidewall 247 of the card reader portion housing 244 as shown in FIG. 3, are opposingly symmetrical. The distance from a center of each of the end members of the plurality of mating members 322 to a closest end of the card reader portion housing 244 (the rear sidewall 253 and the front sidewall 251, respectively) is equal. The distance from a center of the middle member of the plurality of mating members 322 to each of the ends of the card reader portion housing 244 (the rear sidewall 253 and the front sidewall 251) is also equal.

The plurality of notches 314, which may comprise two end notches and a middle notch disposed on the underside of the right base wall 306 and the left base wall 304 of the cup portion housing 207, are also opposingly symmetrical. Likewise, the distance from a center of the second portion 317 of the end notches of the plurality of notches 314 to a closest end of the substantially rectangular base portion 235 of the cup portion housing 207 (either the rear base wall 310 and the front base wall 308, respectively) is equal. The distance from a center of the second portion 317 of the middle notch of the plurality of notches 314 to each of the ends of the substantially rectangular base portion 235 of the cup portion housing 207 (the rear base wall 310 and the front base wall 308) is also equal.

Once disconnected from the card reader portion 205, the user is able to rotate 180° and reconnect the cup portion 203 to the card reader portion 205. As previously described, connection is accomplished by fitting the plurality of mating members 322 into the plurality of notches 314 and sliding the cup portion 203. The cup portion 203 is slid in the direction of the arrow 403 until the rear base wall 310 is substantially flush with the front sidewall 251 of the card reader portion housing 244.

Although not shown, it will be recognized that the card reader portion 205 could be separately mounted with respect to the cup portion 203. A substantially rectangular cover (not shown) may be connected to the card reader portion 205 for cosmetic and protective purposes. The substantially rectangular cover includes a flat top and sidewalls, similar to the sidewalls of the substantially rectangular base portion 235 (FIG. 3), extending downward therefrom. A plurality of notches, similar to the plurality of notches 314, are disposed along an underside of opposing sidewalls. The plurality of mating members 322 of the card reader portion 205 and the plurality of notches of the substantially rectangular cover permit quick connection and disconnection in the manner previously described with respect to the cup portion 203 and the card reader portion 205.

The plurality of mounting tangs 330 further permit connection of the card reader portion 205 and the slotted opening 201 disposed on the rear sidewall 253 thereof either frontwardly or rearwardly. Each of the plurality of mounting tangs 330 are disposed about the bottom surface 245 of the card reader portion housing 244 at locations that are equidistant from a respective closest end (either the front sidewall 251 or the rear sidewall 253) of the card reader portion housing 244. As a result, the plurality of mounting tangs 330 engage the plurality of keyhole openings 132 of the clamshell bracket 128 similarly regardless of the whether the slotted opening 201 disposed on the rear sidewall 253 is oriented to face frontwardly or rearwardly with respect to the mounting receptacle 102.

The slotted opening 201 of the card reader portion 205, which faces rearwardly in FIG. 4, can be rotated to extend frontwardly. When the mounting receptacle 102 is in the released position shown in FIG. 4, the cup portion 203 can be lifted away from the card reader portion 205 since the hook portion 325 of each of the plurality of mating members 322 will slide through the first portion 315 of each of the plurality of notches 314 (FIG. 3).

Once separated, the card reader portion 205 is disconnected from the clamshell bracket 128 by sliding the card reader portion 205 in the direction described by arrow 403, such that the shaft portion 332 of each of the plurality of mounting tangs 330 is removed from the slot portion 134 of each of the plurality of keyhole openings 132 and the disc portion 331 of each of the plurality of mounting tangs 330 is positioned beneath the circular portion 133 of each of the plurality of keyhole openings 132. The card reader portion 205 can then be lifted away from the clamshell bracket 128 since the disc portion 331 of each of the plurality of mounting tangs 330 will slide through the circular portion 133 of each of the plurality of keyhole openings 132. The card reader portion 205 is then rotated 180° and positioned for reconnection to the clamshell bracket 128 by fitting each of the plurality of mounting tangs 330 into the circular opening 133 of each of the plurality of keyhole openings 132. The card reader portion 205 is then slid in a direction opposite of the arrow 403 to effectuate complete connection to the clamshell bracket 128 in the manner previously described.

The plurality of mounting tangs 330 may be equally spaced such that the center axis of each of the plurality of mounting tangs is at a corner of a square. This allows the mounting receptacle 102 to be oriented longitudinally or laterally when attached to the clamshell bracket 128.

Although not shown, it will be recognized that the cup portion 203 could be used independently of the card reader portion 205. The cup portion 203 may include tangs, similar to the plurality of tangs 330, extending from the underside thereof. The cup portion 203 can then be connected directly to the clamshell bracket 128 so as to face frontwardly or rearwardly.

The cup portion 203 is then repositioned for connection to the card reader portion 205. The plurality of mating members 322 are fitted into the plurality of notches 314 such that the bottom edge surface 312 of the cup portion 203 is juxtaposed with the top edge surface 324 of the card reader portion 205. Complete connection of the cup portion 203 to the card reader portion 205 is accomplished by sliding the cup portion 203 as previously discussed in relation to FIG. 4. Unlike the substantially permanently mounted receptacles of the prior art, the mounting receptacle 102 can, thus, be quickly and easily re-oriented at the user's convenience. The appearance of the mounting receptacle 102 that results from positioning the slotted opening 201 to face frontwardly is shown in FIG. 5.

Figure 5:
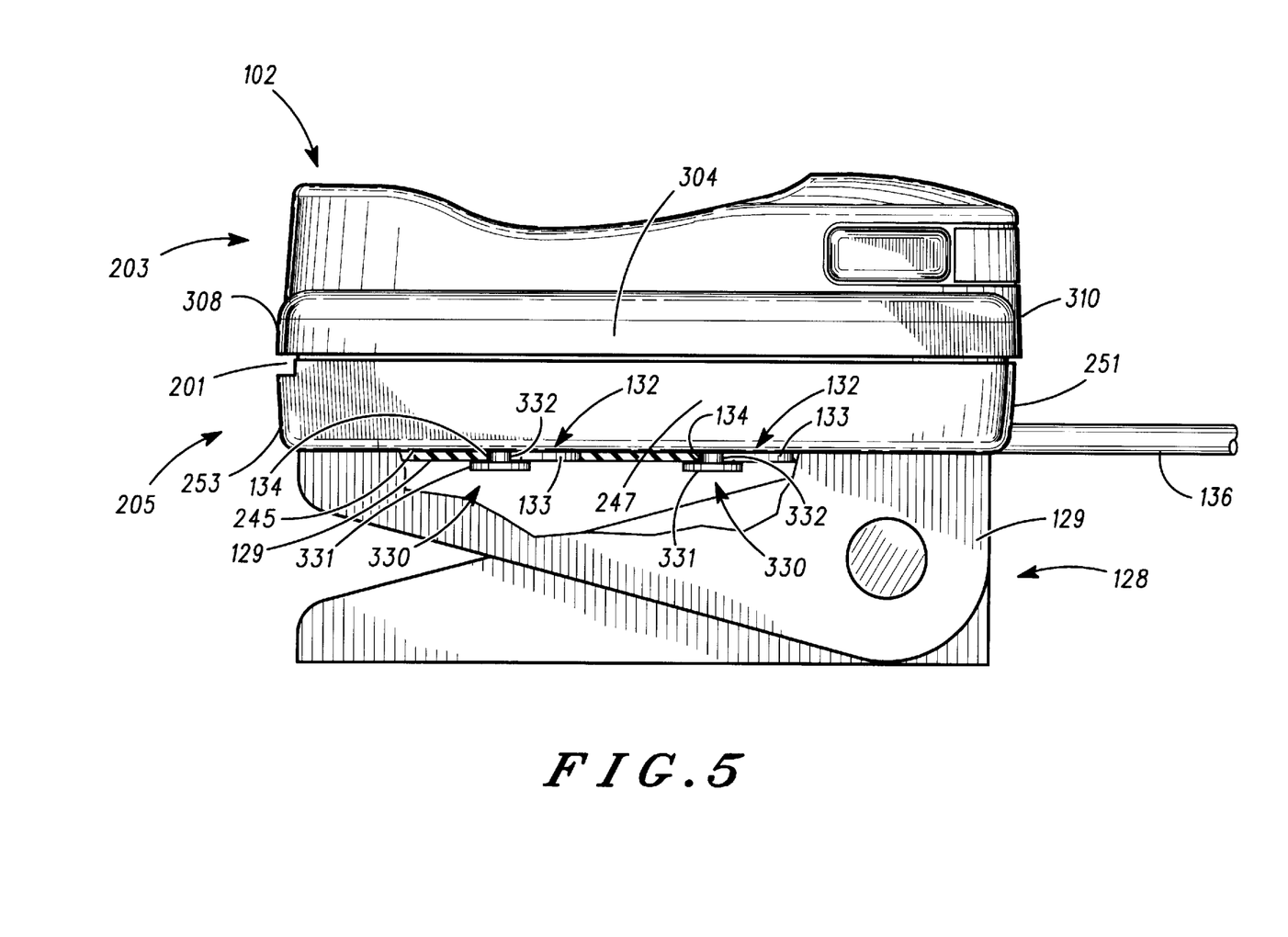
FIG. 5. illustrates a left side view of the mounting receptacle and mounting bracket, showing the cup portion connected to the card reader portion with the opening facing frontwardly and the card reader portion attached to the mounting bracket, a portion of the mounting bracket being broken away.

FIG. 5 illustrates a left side view of the mounting receptacle 102, showing the cup portion 203 completely connected to the card reader portion 205 and the clamshell bracket 128 and the slotted opening 201 facing frontwardly. FIG. 5 shows that upon rotation and reattachment, the right sidewall 247, the rear sidewall 253, and the front sidewall 251 of the card reader portion 205 reside beneath the left base wall 304, the front base wall 308, and the rear base wall 310 of the cup portion 203, respectively. The data transfer cable 136 exits the mounting receptacle 102 from the front sidewall 251.

Figure 6:
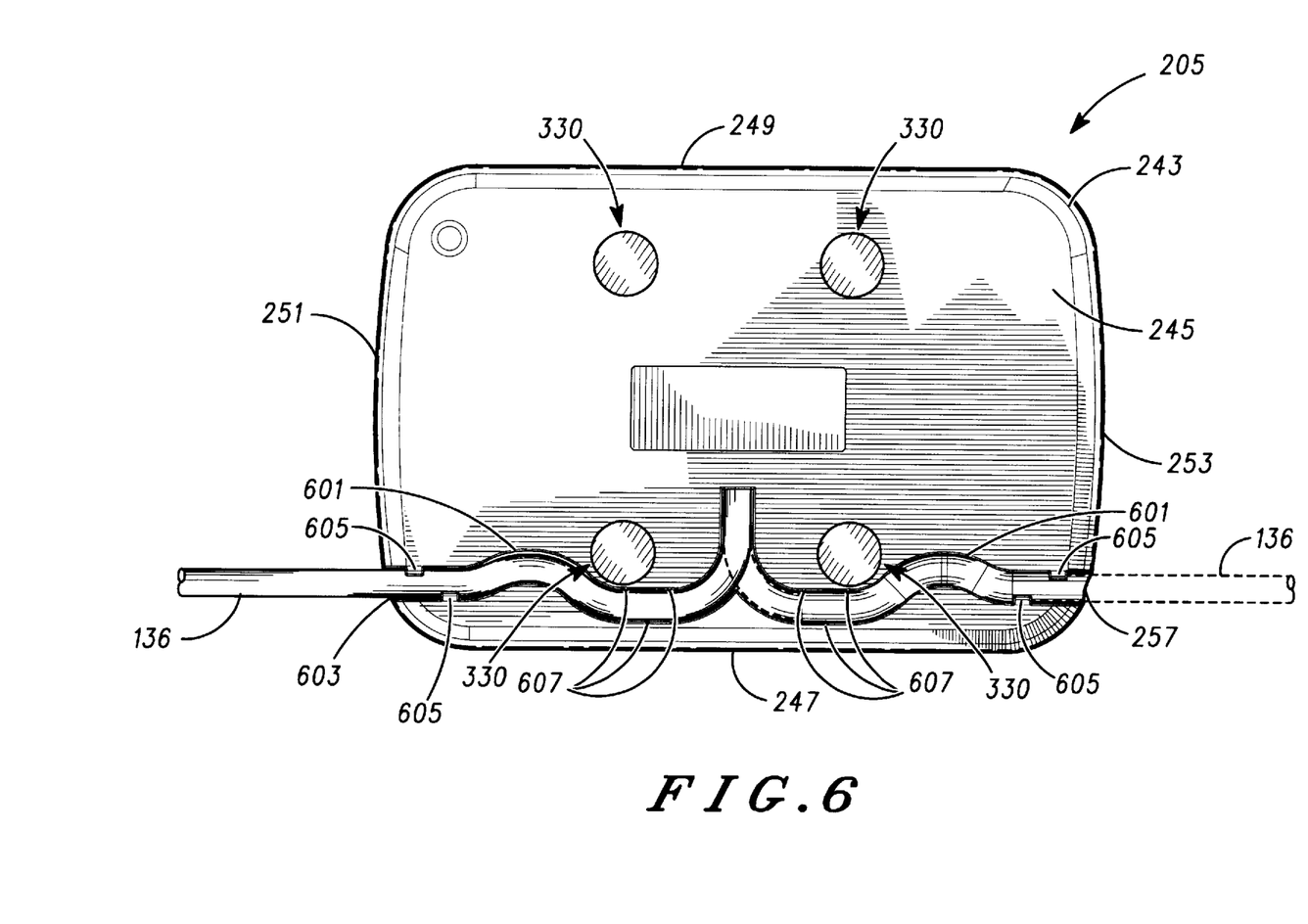
FIG. 6 illustrates a bottom plan view of the card reader portion of the mounting receptacle.

FIG. 6 illustrates a bottom plan view of the card reader portion 205 showing a cable channel 601. The cable channel 601 is molded into the bottom surface 245 and along the right sidewall 247 of the card reader portion housing 244. The cable channel 601 extends longitudinally across the bottom surface 245 between the arched opening 257 on the rear sidewall 253 and a similar arched opening 603 on the front sidewall 251. When the card reader portion 205 is disconnected from the clamshell bracket 128 (FIG. 1) the user is able to conveniently position or dress the data transfer cable 136, which enters at the center of the cable channel 601, such that it exits from either the rear sidewall 253 or the front sidewall 251. The cable channel 601 is sized in accordance with a diameter of the data transfer cable 136; therefore, when positioned in the cable channel 601, the data transfer cable 136 does not extend through the plane formed of the bottom surface 245. A plurality of tabs 605 extend, planarly from the bottom surface 245, into the cable channel 601 to retain the data transfer cable 136. The cable channel 601 is curved or serpentine shaped and includes a plurality of integral grips 607 to alleviate strain placed on the data transfer cable 136 when pulled during or after positioning. This prevents unwanted detachment of the data transfer cable 136 from the cable connector 321 of the card reader 301 (see FIG. 3).

Although not illustrated, it will be recognized within the scope of the present invention that the cup portion 203 and the card reader portion 205 could be positioned such that the slotted opening 201 is accessible from any side of the mounting receptacle 102. This could be accomplished by altering the peripheries of the bottom edge surface 312 and the top edge surface 324 of the cup portion 203 and the card reader portion 205 of FIG. 3, respectively, from the substantially rectangular plan shape illustrated in FIGS. 1 through 6 to a substantially square plan shape. The quick disconnect connector for this square mounting receptacle is accomplished by equipping either the square cup portion or the square card reader portion with latch members, one movable and one fixed, disposed on opposing sides thereof. In the other of the square cup portion and the square card reader portion, notches for receiving the latch members are disposed on all sides thereof. As a result, the square cup portion and the square card reader portion can be snapped together such that the slotted opening faces any one of the sides. A mechanism disposed in the square mounting receptacle could be coupled between the movable latch member and an externally accessible button carried on the square mounting receptacle. Upon actuation of the button, the movable latch member retracts from the corresponding notch so as to permit disconnection of the cup portion from the card reader portion for repositioning. In addition, the square mounting receptacle includes a cable channel that extends along the bottom surface to all of the sidewalls of the square card reader portion.

In summary, the mounting receptacle with card reader includes a cup portion and a card reader portion containing both a card reader and an opening for permitting insertion of an information card into the card reader. The cup portion and the card reader portion are detachably coupled via a connector formed of the cup portion and the card reader portion that consists of a plurality of mating members that interlock a plurality of notches. The connector allows the user to quickly detach and attach the card reader portion and the cup portion such that the opening faces a front or a rear of the mounting receptacle with card reader. In addition, a card reader data transfer cable emanating from the card reader portion may be positioned to extend either from the front or the rear of the mounting receptacle with card reader. Unlike previous mounting receptacles, the user is able to easily change the orientation and positioning of the mounting receptacle with card reader and without the aid of a service technician.

We claim:

1. A mounting receptacle for securing a telephone handset, the mounting receptacle including a card reader and having a plurality of sides, the mounting receptacle comprising:

a cup portion including a first housing, said first housing having a top surface including a recess for receiving a portion of the telephone handset, a latch mechanism to hold the portion of the telephone handset in the recess, and a bottom edge periphery defining a footprint of the cup portion;

a card reader portion including a second housing, said second housing having a top edge periphery, a cavity beneath said top edge periphery for seating of the card reader therein, and a notch formed in said top edge periphery; and a quick disconnect connector releasably securing said cup portion to said card reader portion in any one of two different orientations to position said notch of the card reader portion on any one of two different ones of the plurality of sides of the mounting receptacle and to join said bottom edge periphery of said cup portion to said top edge periphery of said card reader portion, said notch bounded by said bottom edge periphery to form an opening sized to permit insertion of an information card into the card reader.

2. The mounting receptacle according to claim 1 wherein the at least two different ones of the plurality of sides of the mounting receptacle includes a front side and a rear side, said quick disconnect connector positioning said opening on said rear side or, alternatively, positioning said opening on said front side.

3. The mounting receptacle according to claim 1 wherein said quick disconnect connector includes:

a plurality of notches disposed about one of said top and bottom edge peripheries, each of said plurality of notches including an integral ledge; and a plurality of mating members disposed about the other one of said top and bottom edge peripheries to extend therefrom.

4. The mounting receptacle according to claim 3, wherein each of said plurality of mating members includes a hook for interlocking with the integral ledge of a corresponding one of said plurality of notches when said first housing and said second housing are connected.

5. The mounting receptacle according to claim 1 further including a cable extending from said second housing for connection of said card reader to a transceiver, wherein said second housing contains a cabling channel formed in a bottom surface thereof for receipt of said cable.

6. The mounting receptacle according to claim 5, wherein said cabling channel extends across said second housing such that said cable can be positioned to extend from one side of the mounting receptacle or, alternatively, positioned to extend from another side of the mounting receptacle.

7. The mounting receptacle according to claim 6, wherein said cable enters said cabling channel near a center thereof.

8. The mounting receptacle according to claim 6 wherein said cabling channel is curved to receive said cable in an arched orientation, said cable in an orientation arched to relieve strain placed on said cable if said cable is pulled.

9. The mounting receptacle according to claim 5, wherein said cabling channel extends to a front side and a rear side of the mounting receptacle.

10. The mounting receptacle according to claim 3 further comprising a first end, a second end opposite the first end, and first and second sides extending between the first and second ends, and wherein one of said plurality of mating members is disposed equidistant between said first and second ends.

11. The mounting receptacle according to claim 3 further comprising a first end, a second end opposite the first end, and first and second sides extending between the first and second ends, and wherein one of said plurality of mating members is disposed a first positive distance from said first end and another of said plurality of mating members is disposed a second positive distance from the second end, the first positive distance equaling the second positive distance.

12. A mounting receptacle for securing a telephone handset, the mounting receptacle having a first end, a second end opposite the first end, and first and second sides extending between the first and second ends, the mounting receptacle comprising:

a cup portion including a top surface including a recess for receiving and securing a portion of the telephone handset;

a card reader portion including a cavity for seating of a card reader therein, the card reader portion including an opening to permit insertion of an information card into the card reader; and a quick disconnect connector releasably securing the cup portion to the card reader portion, the quick disconnect connector comprising a plurality of mating members and a plurality of notches, the plurality of mating members disposed on one of the cup portion and the card reader portion, one of the plurality of mating members positioned closest to the first end of the mounting receptacle at a first positive distance therefrom, another one of the plurality of mating members positioned closest to the second end of the mounting receptacle at a second positive distance therefrom, the first positive distance equaling the second positive distance, the plurality of notches positioned on the other one of the cup portion and the card reader portion to receive the plurality of mating members in any one of two different orientations.

13. The mounting receptacle according to claim 12 wherein the plurality of mating members includes two mating members, a first one of the two mating members positioned at the first side of the mounting receptacle equidistant between the first and second ends thereof, a second one of the two mating members positioned at the second side of the mounting receptacle equidistant between the first and second ends thereof.

14. The mounting receptacle according to claim 12 wherein the plurality of mating members comprises four mating members, a first one of the four mating members located at the first side of the mounting receptacle in proximity to the first end, a second one of the four mating members located at the first side of the mounting receptacle in proximity to the second end, a third one of the four mating members located at the second side of the mounting receptacle in proximity to the first end, and a fourth one of the four mating members located at the second side of the mounting receptacle in proximity to the second end.

15. A mounting receptacle for securing a telephone handset, the mounting receptacle having a plurality of sides, the mounting receptacle comprising:

a cup portion including a first housing, said first housing having a top surface including a recess for receiving a portion of the telephone handset and a latch mechanism to hold the portion of the telephone handset in said recess;

a card reader portion including a second housing having a bottom surface and side walls extending upward therefrom forming a cavity for seating of a card reader in juxtaposition with said bottom surface, one of said side walls including a first opening to permit insertion of an information card into the card reader, said bottom surface having a second opening for permitting passage of a cable attached to the card reader therethrough, said bottom surface having a cabling channel extending between opposing ones of said side walls to route said cable so that it extends from any one of two different ones of the plurality of sides of the mounting receptacle, said second opening located at a midpoint of said cabling channel to ensure that said cable extends a same distance from each of the two different ones of the plurality of sides of the mounting receptacle; and a quick disconnect connector releasably securing said cup portion to said card reader portion to position said first opening of said card reader portion on any one of the two different ones of the plurality of sides of the mounting receptacle.

16. The mounting receptacle according to claim 15 wherein said cabling channel is curved to relieve strain placed on said cable if said cable is pulled.

17. The mounting receptacle according to claim 15 wherein said cabling channel is symmetrically shaped about said midpoint thereof.

18. The mounting receptacle according to claim 15 wherein said card reader further comprises a planar bottom surface having a right angle connector disposed thereon, said right angle connector to electrically connect said cable to said card reader, said cable, once connected, substantially juxtaposed with said planar bottom surface.

19. The mounting receptacle according to claim 15 wherein the at least two different ones of the plurality of sides of the mounting receptacle includes a front side and a rear side, said cabling channel routing said cable to said rear side or, alternatively, routing said cable to said front side.

20. The mounting receptacle according to claim 15 wherein said cup portion further comprises a bottom edge periphery, and said card reader portion further comprises a top edge periphery formed of said side walls opposite the bottom surface, said opening formed in said top edge periphery and bounded by said bottom edge periphery.

\* \* \* \* \*